(12) United States Patent
Crowther

(10) Patent No.: US 6,243,697 B1
(45) Date of Patent: Jun. 5, 2001

(54) DETECTING SERVICE INTERACTIONS IN A TELECOMMUNICATIONS NETWORK

(75) Inventor: Michael John Crowther, Felixstowe (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/043,307
(22) PCT Filed: Sep. 17, 1997
(86) PCT No.: PCT/GB97/02505
  § 371 Date: Mar. 18, 1998
  § 102(e) Date: Mar. 18, 1998
(87) PCT Pub. No.: WO98/14017
  PCT Pub. Date: Apr. 2, 1998

(30) Foreign Application Priority Data

Sep. 26, 1996 (EP) .................................................. 96307033

(51) Int. Cl.[7] ...................................................... G06N 5/04
(52) U.S. Cl. .................................. 706/50; 706/10; 706/21; 706/45
(58) Field of Search ..................... 706/10, 21, 45, 706/50; 707/9

(56) References Cited

U.S. PATENT DOCUMENTS

| | | | |
|---|---|---|---|
| 4,754,409 | * | 6/1988 | Ashford et al. ...................... 706/10 |
| 5,175,800 | * | 12/1992 | Galis et al. ............................ 706/45 |
| 5,444,820 | * | 8/1995 | Tzes et al. ............................. 706/21 |
| 5,694,590 | * | 12/1997 | Thuraisingham et al. ............... 707/9 |

OTHER PUBLICATIONS

Chuen-Tsai Sun, Rule-base structure identification in an adaptive-network-based fuzzy inference system, Fuzzy Systems, IEEE Transactions on, vol. 2 1, Feb. 1994, pp. 64-73, Feb. 1994.*

* cited by examiner

Primary Examiner—Mark R. Powell
Assistant Examiner—Wilbert Starks
(74) Attorney, Agent, or Firm—Nixon & Vanderhye P.C.

(57) ABSTRACT

A system for detecting interaction between different services on a telecommunications network includes a computer expert system. A data store in the expert system is programmed with data which represent attributes of service features. A rule store is programmed with rules which relate feature attributes to interaction behaviors. An inference engine is connected to the data store and to the rule store and processes the data and the rules to detect any interaction between the services. The data in the data store may be arranged as sets of objects, each object in a set corresponding to a different state transition of the corresponding feature. The different objects may be given sequence numbers corresponding to the time sequence of execution of the feature. At least some of the rules may relate to these sequence numbers.

7 Claims, 4 Drawing Sheets

ATS: Access Transaction Segment
UTS: User Transaction Segment
AS: Associator Segment
CD: Customer Data

DETECTING SERVICE INTERACTIONS IN A TELECOMMUNICATIONS NETWORK

BACKGROUND OF THE INVENTION

The present invention relates to telecommunications networks, and in particular to the detection of undesirable interactions between different services running on a network.

RELATED ART

Telecommunications networks are increasingly required to offer customers services in addition to basic call-handling. The development of novel network architectures, such as the IN (intelligent network) architecture, together with developments in computing platforms for telecommunications systems, make it potentially possible to offer customers a large portfolio of additional services to select from. However, as the number of services increases, and as services become available from independent service providers in addition to the network operator, then service feature interaction becomes a serious problem. It is often found that features offered by one service interact in an unwanted manner with features of other services. For example, a voice messaging service, such as BT's CallMinder service, may have as one of its standard features a behaviour such that incoming calls are diverted to the messaging service whenever the called line is busy. Another available service, Call Waiting, handles the same condition, namely the called number being busy, in an entirely different fashion. The Call Waiting service transmits an alert tone to the user and gives the user the option of interrupting the on-going call to speak to the new caller. It can be seen that if a customer wanted to subscribe to both services, then there is conflict between the service features which needs to be resolved. Otherwise, it would be necessary to bar the provisioning of both of these services to a customer, with a consequent loss in utility to the customer, and loss of revenue to the service provider.

Conventionally, during the planning of new services for a telecommunications network, attempts have been made to detect in advance any interaction problems by writing English-language specifications of the service features. Using these specifications a paper "walk through" of the services is then conducted, with the design engineer going step by step through the different services and spotting any interaction problems. This is a time-consuming procedure which can never be completely reliable, leaving the possibility that unforeseen interactions will occur when the service is deployed.

Some attempts have been made previously to automate the detection of interaction during the design phase. For example, International patent application WO95/22231 discloses a method of detecting service interactions which uses formal specifications of the additional services. The algorithm uses information that is specific to the services being tested which needs to be rewritten every time a change is made to one of the service features. Moreover, the approach adopted requires that a formal model should be prepared for every service feature which is handled. The preparation of such formal models is a difficult and time-consuming task requiring a high level of expertise.

SUMMARY OF THE INVENTION

According to a first aspect of the present invention, there is provided a system for detecting interaction between services running on a telecommunications network comprising:

a computer expert system including:
  a) a data store programmed with data representing attributes of service features;
  b) a rule store programmed with rules which relate feature attributes to interaction behaviours; and
  c) an inference engine which is connected to the data store and to the rule store and which is arranged to process the data and the rules, thereby detecting any interaction between the services.

The present invention adopts a radically new approach to the detection of service feature interaction, through the use of an expert system. The traditional domain of use of expert systems is for diagnostic classification problems involving data which is essentially static. A well known example is the identification of a particular bacterium from a series of statements about its properties and appearance. In this domain, expert system technology has a proven track record in reproducing and sometimes surpassing human expert performance for the same problem. It is not however been thought possible hitherto to apply such techniques to the problem domain of the present invention. Feature interaction in a telecommunications network is an essentially time-related phenomen and so on the face of it not suitable for expert system techniques. The present inventors have found however that with an appropriate knowledge representation, expert systems can successfully be used for feature interaction detection. This provides a dramatic reduction in the time required to uncover service interworking problems, coupled with increased flexibility. The separation between the knowledge representation and the inference rules, means that changes or additions to the services can readily be assessed simply by making corresponding changes to the knowledge representation in the data store. In this way, the system is quickly able to detect any problems arising from the new features. By contrast with the prior art systems there is no need to repeat an entire "walk-through" from scratch.

The system of the present invention may run, for example, at a local switch in a telecommunications network to aid the detection and management of interaction problems as they occur. Alternatively, or in addition, the system may be used during the development of a new service to detect any interaction problems prior to the deployment of the service.

In the case of a system used at run-time in the network, then the output of the system may be fed to a control system for modifying the behaviour of the network in order to remove or ameliorate the detected interaction problem. The control system may, for example, modify the stored profile for a customer in order to disable one or more service features. A more sophisticated control system might initiate a dialogue with the customer to allow the customer to determine a default behaviour for the network. For example, in the case of the Call Minder or call waiting services, the user might be given the option of selecting the Call Waiting response, that is the transmission of an alert tone, rather than the Call Minder response, that is the transfer of the incoming call to a messaging service.

Preferably the expert system data store includes a plurality of objects including, for each service feature which is represented in the data store, a set of objects corresponding to different respective state transitions of the feature.

The term "object" is used in this document in the sense of object oriented design/programming (OOD/OOP) methodologies.

As discussed in further detail below, the choice of an appropriate structure for organising the data in the data store is critical in maximising the efficiency of the interaction detection system. The inventors have found that the combination of the use of an object-based structure and a state transition representation of the service feature offers significant advantages both in efficiency of operation and in ease of development and modification of the detection system. The use of sets of objects representing different state transitions makes it possible to capture the characteristics of a service feature in a form which is well-adapted for processing by the inference engine.

Preferably each of the said set of state transition objects includes a sequence number corresponding to the position of the respective state transition in the sequence of execution of the feature and at least some of the rules in the rule store reason over the values of the sequence numbers. Preferably the objects are arranged in a hierarchy of superclasses and subclasses of the superclasses, and some of the rules reason over superclasses and others of the rules reason over subclasses.

The use of objects belonging to a hierarchy of classes, combined with rules which operate at different levels of the class hierarchy further increases the flexibility of the system. In particular, it ensures that when a new object is added to the data store, for example as the result of a modification to a service feature, there will already exist rules functioning at a higher level of the hierarchy which are immediately applicable to the new object, so that extensive modification of the rules is not required.

According to a second aspect of the present invention there is provided a method of detecting interaction between services running on a telecommunications network comprising:

programming a computer expert system with data representing attributes of service features and with rules relating feature attributes to interaction behaviours;

processing the said data and the said rules in an inference engine and detecting thereby any interaction between the said services.

According to a third aspect of the present invention, there is provided a method of operating a telecommunications network comprising:

programming a computer expert system with data representing attributes of service features and with rules relating feature attributes to interaction behaviours;

processing the said data and the said rules in an inference engine and detecting thereby any interaction between the said services; and modifying the operation of the network when an interaction is detected.

BRIEF DESCRIPTION OF THE DRAWINGS

Systems and methods embodying the present invention will now be described in further detail, by way of example only, with reference to the accompanying drawings in which.

DETAILED DESCRIPTION OF EXEMPLARY EMBODIMENTS

Figure 1:
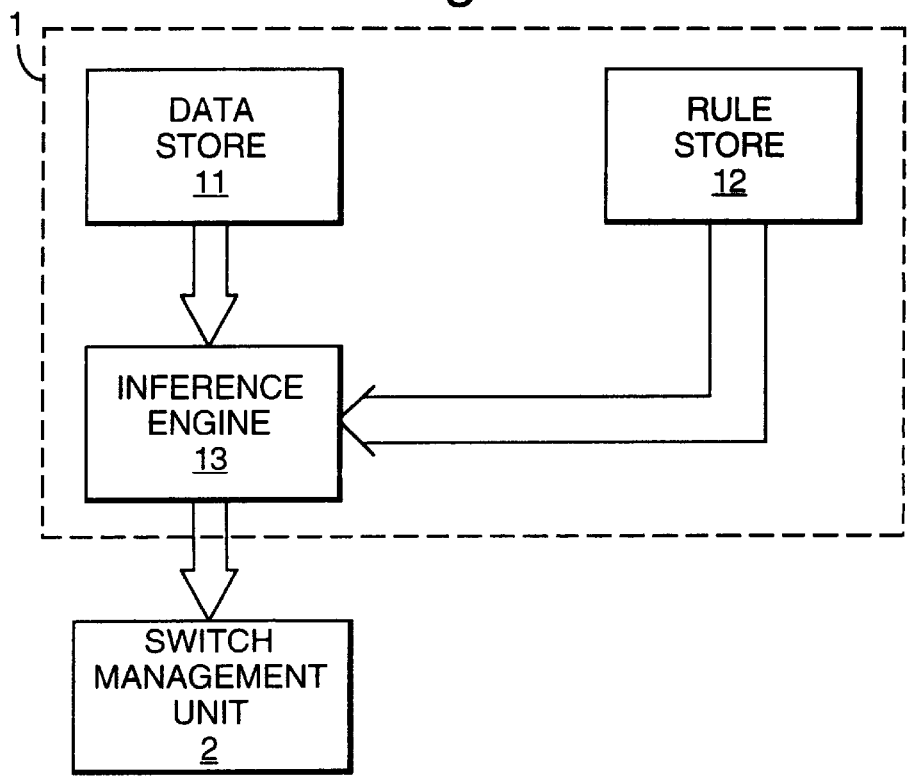
FIG. 1 is a schematic of a system for detecting service feature interaction.
Figure 2:
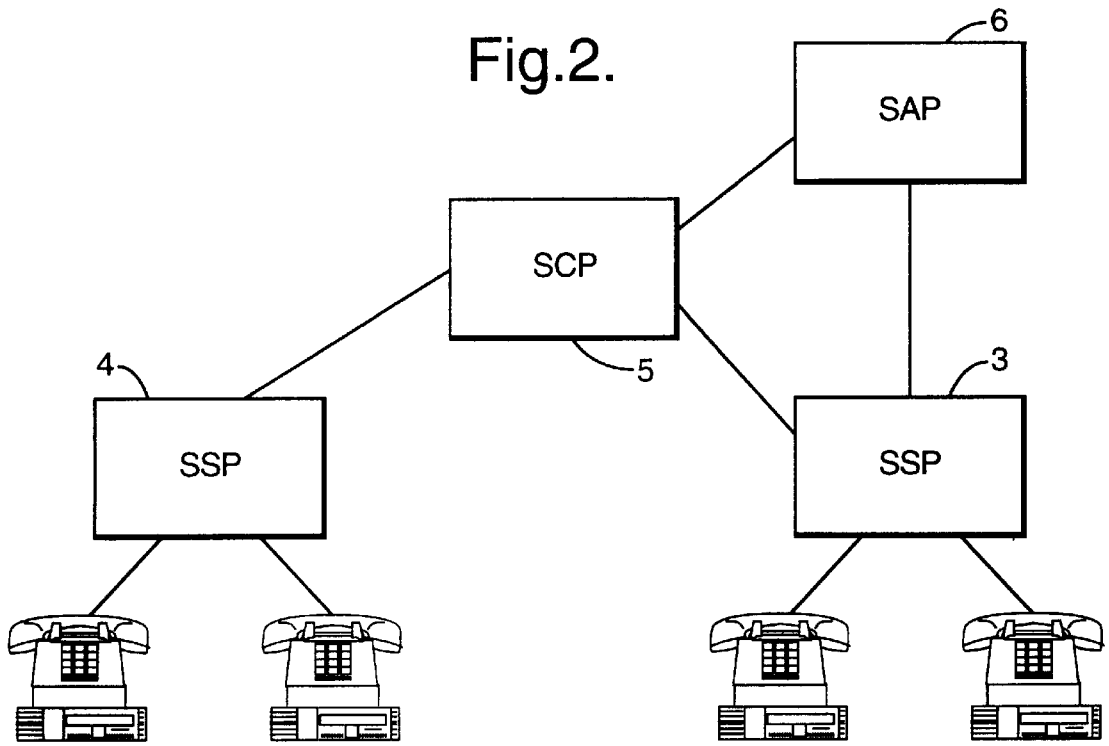
FIG. 2 is a schematic of a network having an IN architecture.

A system for detecting and managing interactions between services running on a telecommunications network comprises an expert system 1 which in this example is connected to a switch management unit 2 within a service switching point (SSP) 3. As shown in FIG. 2, the service switching point forms part of a telecommunications network employing an IN (intelligent network) architecture and including a further SSP 4, a service control point (SCP) 5 and an intelligent peripheral 6. The network, other than in the features described in further detail below, is conventional in nature. For further details of the IN architecture reference is made to the paper by T W Abernethy & A C Munday, "Intelligent Networks, Standards and Services", BT Technol J, Vol. 13, No. 2, April 1995 and to the European Telecommunications Standards Institute Final Draft PRETS 300374-1, published July 1994, the contents of both of which are incorporated herein by reference.

Figure 5:
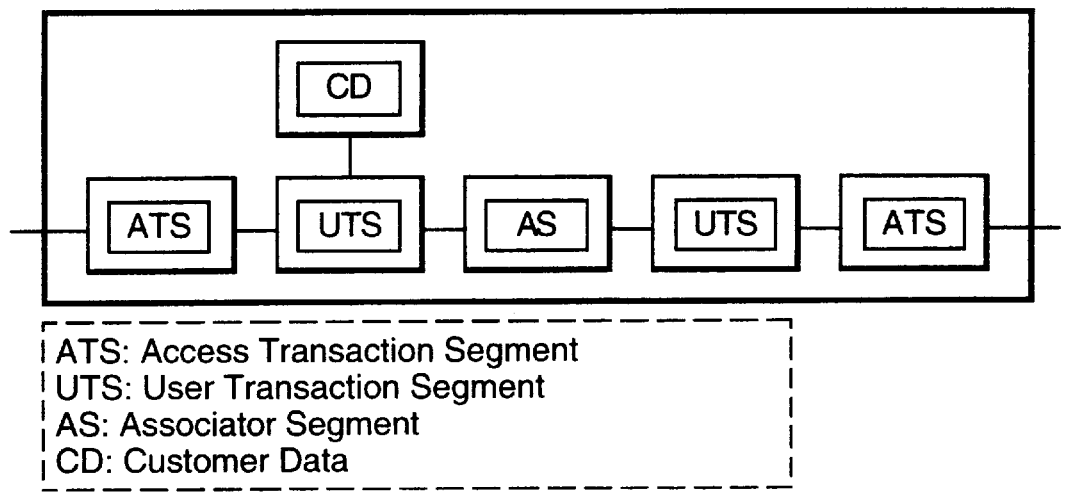
FIG. 5 shows the structure of the switch management unit.

The call control software within the switch management unit is structured as described in the paper by HM Blair, "Attacking Product Complexity: Broadband Call Control for Vision O.N.E" XIV International Switching Symposium, Oct. 25–30, 1992. FIG. 5 shows the software structured into a chain of connection segments. In this software structure it is the responsibility of the User Transaction Segment (UTS) to invoke feature software and link it into the chain, based on customers' service data. In this example applicaton of the feature interaction expert system, the expert system forms part of the UTS. The expert system gets its input facts from the customer data and/or call progress signalling and the results of processing are used to decide whether to invoke feature software and if so, where in the call chain to link that software.

The expert system 1 includes a data store 11, a rule store 12 and an inference engine 13. In this example, the hardware for the expert system comprises a distributed processing system using Pentium microprocessors with access to local RAM and to mass storage devices. The data store 11 and rule store 12 are embodied in the storage devices and in the local RAM, and the inference engine 13 is provided by appropriate programming of the Pentium microprocessors.

Figure 6:
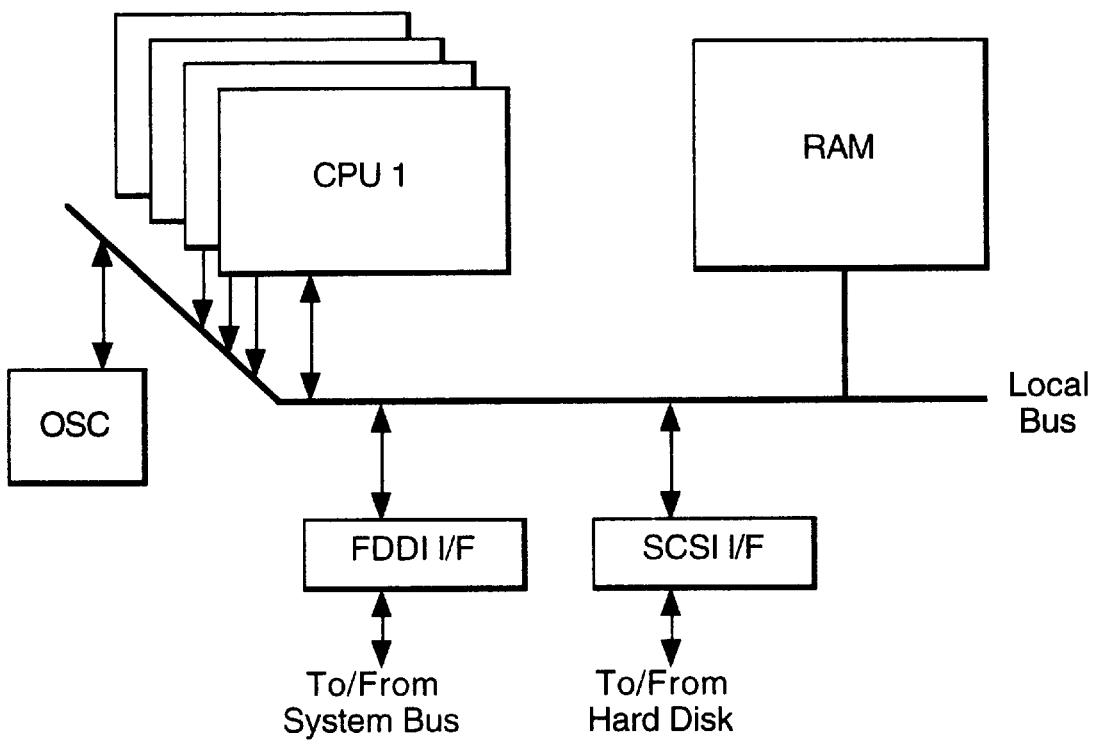
FIG. 6 shows a multiprocessor system for implementing the expert system of FIG. 1.

FIG. 6 shows in further detail the platform used in this example to support the expert system. Multiple Pentium CPU's are linked by a local bus to each other, and to the region of RAM. Data stored on a local hard disk is accessed via a SCSI interface. The multiprocessor system is implemented on a motherboard which is linked to other components of the switch by an FDDI optical fibre LAN. In this example, in order to facilitate the use of an object-oriented knowledge representation, the expert system is implemented using an expert systems shell available commercially from Neuron Data Inc. of Mountain View, Calif. as "NEXPERT OBJECT" (Trade Mark). This is an object-based expert systems implementation tool with facilities for implementation of rules in the C programming language. The implementation of the rules is based on first order predicate logic.

The expert system operates by applying rules to facts. The facts may have been input to the expert system either manually by the human user, or by a call control programme. Alternatively, the facts may have been inferred by previous applications of the rules. The evaluation of a rule assigns a truth value to the hypothesis of the rule, which represents some new fact about the domain. As rules may trigger other rules in their predicate actions, a set of rules comprises a network through which simple conclusions may be propagated to arrive at more complex results.

It is found to be important that an appropriate form of knowledge representation is used for the facts. This is particularly true for the problem domain of the present invention. As discussed in the introduction above, feature interaction is a characteristically time-related phenomenon, whereas expert systems have traditionally been applied to static diagnostic or classification problems. The preferred implementation of the present invention uses an object-based knowledge representation, in which the objects are derived from state transition models of the service features. A state transition model offers the functionality necessary to describe service features, provided that note is taken of the side effects of the transitions between the various states. It is the side effects that will lead to models becoming interdependent and hence interacting within the network. A telephony feature may make a state transition for a variety of reasons, including response to an event caused by a state transition for some other feature.

Figure 4:
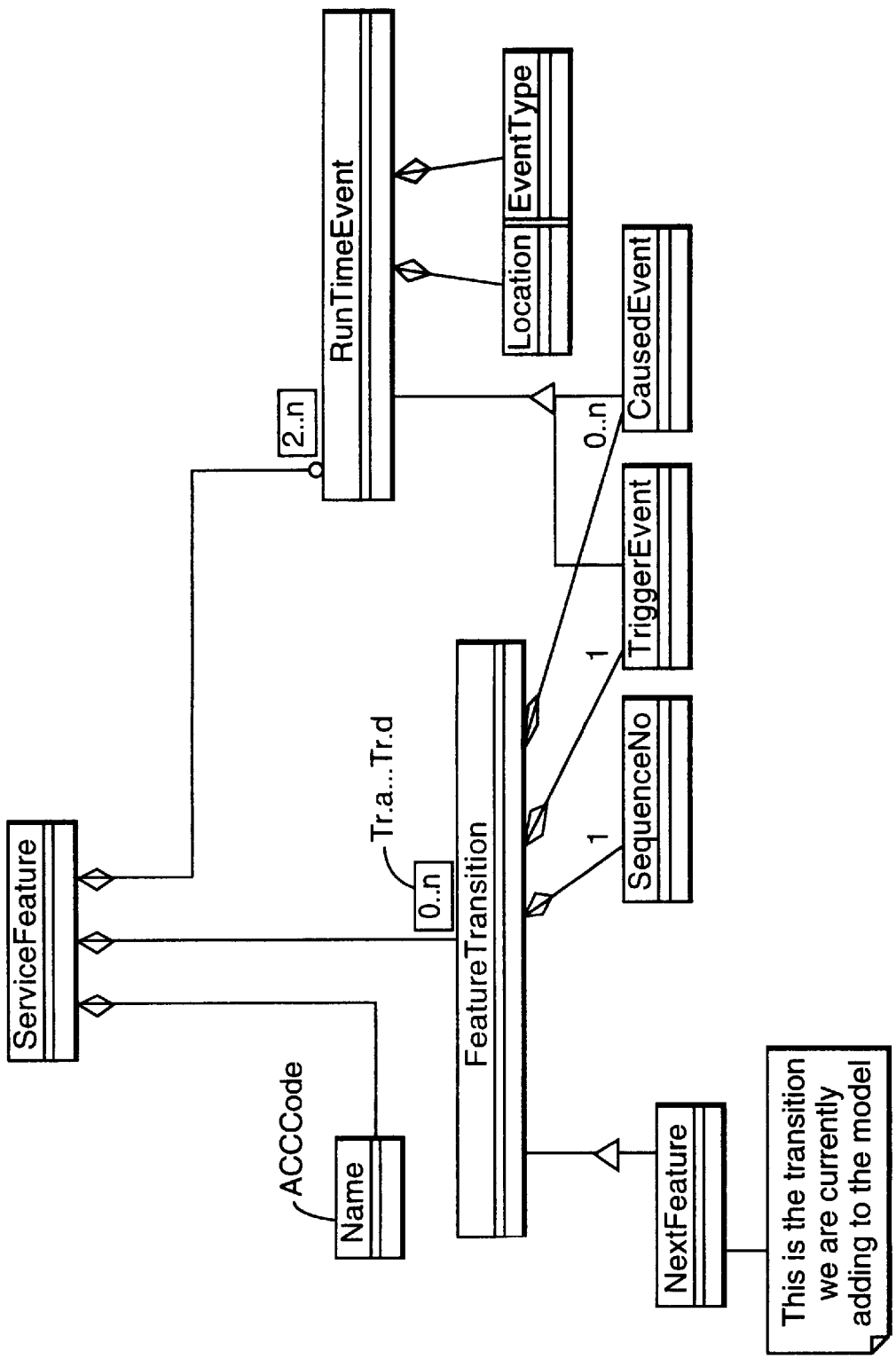
FIG. 4 is a class diagram showing the structure of the objects in the data store of the system of FIG. 1.

In the knowledge representation adopted in the present invention, the data store 11 is programmed with objects corresponding to the state transition of a finite state machine representing the behaviour of a telephony feature. As shown in FIG. 4, the objects belong to classes which define a template for feature state transition objects.

It should be noted that the class does not relate to an instance of the feature acting on a particular call, but describes how the feature will behave depending on its context in a particular call. Rules may then be written concerning behaviour of members of these classes, without reference to actual values of call data.

Figure 3:
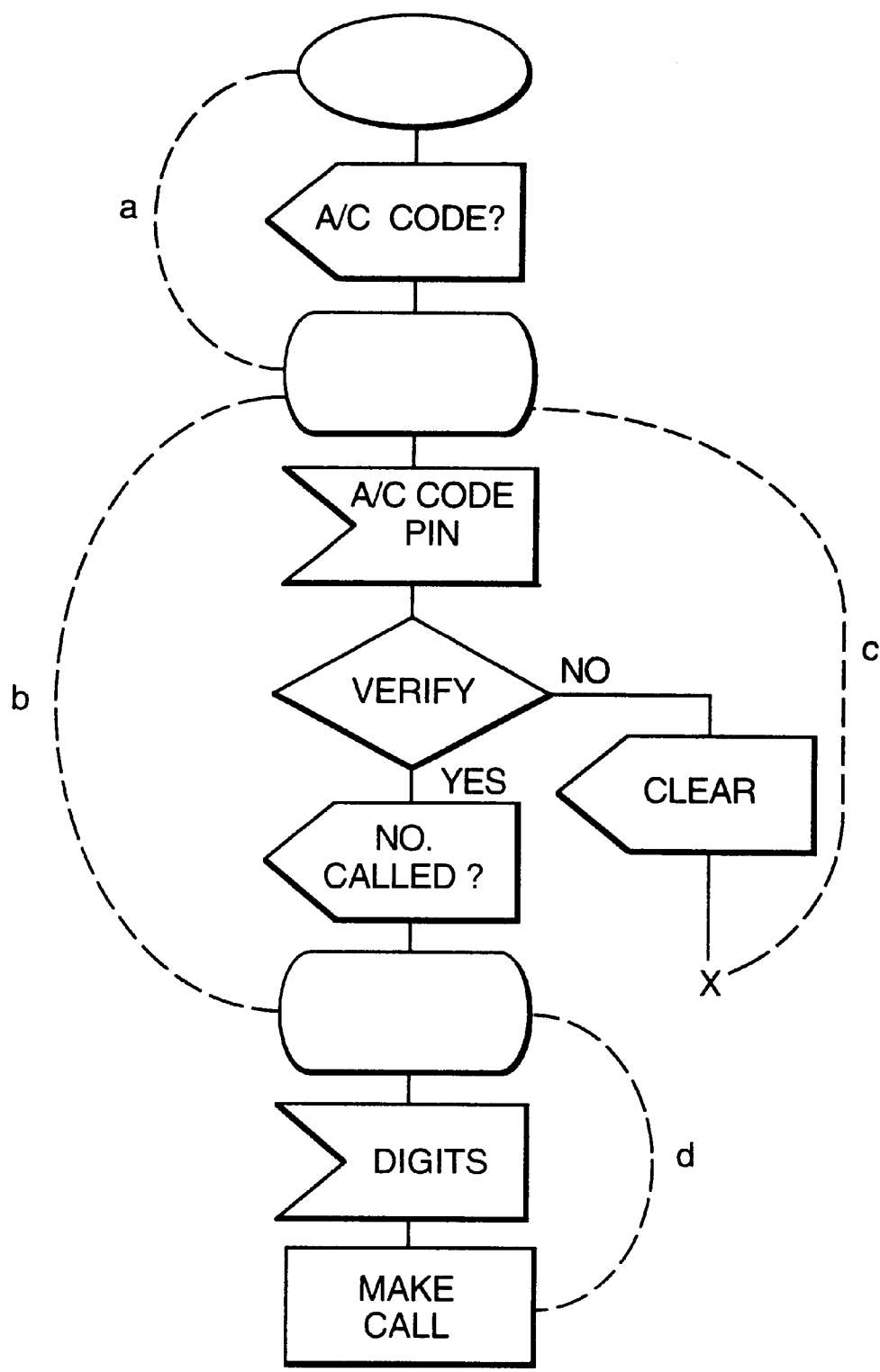
FIG. 3 is a state transition diagram illustrating one example of a service feature.

FIG. 3 is a state transition diagram representation of a service feature. In this example the service is an account code service, such as BT's chargecard service. FIG. 4 is a class diagram showing the objects used to represent such a feature in a system embodying the present invention. FIG. 4 uses the OMT diagram conventions set out in "Object Oriented Modeling & Design", Rumbaugh et al., Prentice Hall, ISBN 0-13-630054-5. As shown in the Figure, the account code service comprises four state transitions, referenced a–d. Within the knowledge base of the expert system, the feature is stored as an instance of the ServiceFeature class, comprising a name "ACCCode" and a set of four Feature Transition objects:

Transition a:
  Sequence no.—1
  Trigger event
    event type—dialled digits
    location—calling party
    data—145
  Caused event
    event type—announcement
    location—calling party
    data—character string "A/C no. ?"
Transition b:
  Sequence no.—2
  Trigger event
    event type—mid-call dialled digits
    location—calling party
    data—e.g. 56789 (valid)
  Caused event
    event type—announcement
    location—calling party
    data—character string "Enter no. ?"
Transition c:
  Sequence no.—2
  Trigger event
    event type—dialled digits
    location—calling party
    data—e.g. 34567 (not valid)
  Caused event
    event type—clear call
    location—general
    data
Transition d:
  Sequence no.—3
  Trigger event
    event type—mid-call dialled digits
    location—calling party
    data—e.g. 01473 644668
  Caused event
    event type—call event
    location—general
    data—e.g. 01473 644668

In developing the rules programmed in the rule store 12, use was made of a set of high level rules developed for this problem domain. These rules are grouped in terms of key words which collect the rules into concept groupings. The rules were then formalised and decomposed into smaller grains of knowledge to allow their implementation. Rules of small semantic weight use facts input to the experts system to extract simple conclusions. The simple conclusions are then forwarded through the rule network for use by one or more rules at a higher level. These larger semantic weight rules eventually form conclusions which correspond directly to the English language definitions of the top level rules.

As information is forwarded through the rule network, some re-use of the lower level rules is achieved. Simple components of knowledge which are useful in the implementation of one high level rule often recur in the conditions of another rule. The choice of rules used in the implementation affects the level of reusability which is achieved. An efficient implementation is arrived at by progressive refinement of the choice of low level rules used. The rule evaluation process moves up through the rule network from data to higher level conclusions. The successful evaluation of a rule often leads to a subset of the feature state transition objects existing within the knowledge base being associated with a conclusion. When this occurs, a class is created dynamically corresponding to the subset of feature states. Those of the higher level rules which make use of the associated hypotheses then generally operate on the subset of feature state transition objects rather than the complete set, thus progressively constraining the scope of this subset and eventually arriving at a smaller one showing some interaction.

Tables 2.1–2.5 show examples of the rules from the rule store 12. It can be seen that hypothesis of low semantic weight such as "trigger location compatible" lead to hypothesis with semantic weight corresponding to the original English language rules such as "triggering conflict". Table 2.4 shows a rule operating on the feature transition attribute "sequence number" to infer that a particular service feature is "persistent" (it remains associated with a call after its initial actions when triggered). Table 2.5 shows a rule operating on objects belonging to the super-class "run time event" to infer that a particular service feature initiates a new call as part of its actions.

In use, when operation of the inference engine results in the hypothesis of rule 2.3 having the value "TRUE" then this result may be acted on by the switch management unit 2 to modify or inhibit one or more of the features running on the switch, so as to resolve the conflict arising from the feature interaction problem. For the particular call control software architecture illustrated in FIG. 5, this involves the User Transaction Segment (UTS) either not invoking the Feature Segment (FS) corresponding to one of the features concerned or modifying the positions in the call chain of the relevant FSs.

TABLE 2.1

If<|feature_transition|>.trigger_event_location equals "remote"
And<|feature_transition|>.trigger_event_location equals next_feature_transition.trigger_event_location
Then trigger_locations_compatible
Action Create Object<|feature_transition|>location_compatible_transition|

TABLE 2.2

If trigger_locations_compatible
And <|location_compatible_transition|>.trigger_event_location equals "remote"
And <|location_compatible_transition|>dest_line_state equals next_feature_transition. dest_line_state
Then line_transition_compatible
Action Create Object <|location_compatible_transition|>compatible_transition|

TABLE 2.3

If line_states_compatible
And <|compatible_transition|>.trigger_event_type equals next_feature_transition.trigger_event_type
And <|compatible_transition|>.local_line_state equals next_feature_transition.local_state
Then triggering_conflict

TABLE 2.4

Rule using the Feature_transition attribute "Sequence number"
If<|service feature|>.<|feature_transitions|>.sequence_number.1
Then persistent feature
Action Ceate Object<|service feature|>persistent_features|

TABLE 2.5

Rule using the "Run time event" class
If<|service feature|>.<|run time_event|>.event_type equals "new call"
The multiple calls feature
Action Create Object<|service_feature|>|multiple_calls_features|

What is claimed is:

1. Apparatus for detecting interaction between services running on a telecommunications network, said apparatus comprising:
   a) a data store programmed with data representing attributes of service features;
   b) a rule store programmed with rules which relate feature attributes to interaction behaviors; and
   c) an inference engine which is connected to the data store and to the rule store and which is arranged to process the data and the rules, so as to detect any interaction between the services, the data store further comprising a plurality of representations of different respective state transitions of the or each feature being arranged in a hierarchy of superclasses and subclasses of the superclasses with some of the rules being for use in reasoning over superclasses and others of the rules being for reasoning over subclasses.

2. Apparatus as in claim 1, in which each of said representations is associated with a sequence number corresponding to the position of the respective state transition in the sequence of execution of the feature and at least some of the rules in the rule store reason over the values of the sequence numbers.

3. A telecommunications network including a system as in claim 1.

4. A telecommunications network including a system as in claim 2.

5. A method for detecting interaction between services running on a telecommunications network, said method comprising:
   a) storing data representing attributes of service features;
   b) storing rules which relate feature attributes to interaction behaviors;
   c) storing a plurality of representations of different respective state transitions of the or each feature, the representations being arranged in a hierarchy of superclasses and subclasses of the superclasses; and
   d) processing the data and the rules, so as to detect any interaction between the services with some of the rules being for use in reasoning over superclasses and others of the rules being for reasoning over subclasses.

6. A method as in claim 5 in which each of said representations is associated with a sequence number corresponding to the position of the respective state transition in the sequence of execution of the feature and at least some of the rules reason over the values of the sequence numbers.

7. A data carrier holding a computer program or suite of computer programs arranged to enable a computer or group of computers to provide the apparatus of claim 1 or to carry out a method for detecting interaction between services running on a telecommunications network comprising:
   a) storing data representing attributes of service features;
   b) storing rules which relate feature attributes to interaction behaviors;
   c) storing a plurality of representations of different respective state transitions of the or each feature, the representations being arranged in a hierarchy of superclasses and subclasses of the superclasses; and
   d) processing the data and the rules, so as to detect any interaction between the services with some of the rules being for use in reasoning over superclasses and others of the rules being for reasoning over subclasses.

* * * * *